United States Patent
Jayaraman et al.

(10) Patent No.: US 9,471,795 B2
(45) Date of Patent: Oct. 18, 2016

(54) SYSTEM AND METHOD PROVIDING PERMISSION BASED ACCESS TO AUTOMOTIVE COMPUTERS

(71) Applicant: Automatic Labs, Inc., San Francisco, CA (US)

(72) Inventors: Ramprabhu Jayaraman, San Francisco, CA (US); Thejovardhana S Kote, San Francisco, CA (US)

(73) Assignee: Automatic Labs, Inc., San Francisco, CA (US)

( * ) Notice: Subject to any disclaimer, the term of this patent is extended or adjusted under 35 U.S.C. 154(b) by 361 days.

(21) Appl. No.: 14/048,602

(22) Filed: Oct. 8, 2013

(65) Prior Publication Data
US 2014/0108819 A1 Apr. 17, 2014

Related U.S. Application Data

(60) Provisional application No. 61/712,388, filed on Oct. 11, 2012.

(51) Int. Cl.
| | |
|---|---|
| *G06F 21/00* | (2013.01) |
| *G06F 21/60* | (2013.01) |
| *G06F 21/44* | (2013.01) |
| *G06F 21/62* | (2013.01) |

(52) U.S. Cl.
CPC .............. *G06F 21/602* (2013.01); *G06F 21/44* (2013.01); *G06F 21/629* (2013.01)

(58) Field of Classification Search
CPC ........ G06F 21/60; G06F 21/44; G06F 21/70; G06F 21/602; G06F 21/629
See application file for complete search history.

(56) References Cited

U.S. PATENT DOCUMENTS

| | | | | |
|---|---|---|---|---|
| 2011/0112717 | A1* | 5/2011 | Resner | G07C 5/008 701/31.4 |
| 2012/0197486 | A1* | 8/2012 | Elliott | G07C 5/008 701/33.2 |
| 2012/0215754 | A1* | 8/2012 | Marzani | F02D 41/266 707/705 |

* cited by examiner

*Primary Examiner* — Jeffrey Pwu
*Assistant Examiner* — Thong Truong
(74) *Attorney, Agent, or Firm* — Donald R. Boys; Central Coast Patent Agency, Inc.

(57) ABSTRACT

A Link device has a processor connected to an internal Link bus, a non-transitory memory, a digital device ID, one or both of firmware or software executing from non-transitory media, a first communication port enabled to communicate with a vehicle bus coupling computerized devices in a vehicle, and a second communication port enabled to communicate with one or more digital devices external to the vehicle. The firmware or software enables the Link device to communicate with the vehicle bus, and to accomplish a variety of tasks including pulling data from data stores in the vehicle and operating specific vehicle functions, and wherein the firmware or software manages communication with the one or more external digital devices, accepting only requests for cooperation with the Link device using the unique device ID with a request that is cryptographically secure.

18 Claims, 4 Drawing Sheets

SYSTEM AND METHOD PROVIDING PERMISSION BASED ACCESS TO AUTOMOTIVE COMPUTERS

CROSS-REFERENCE TO RELATED APPLICATIONS

The present application claims priority to provisional patent application (PPA) Ser. No. 61/712,388, filed Oct. 11, 2012, and all disclosure of the referenced PPA is incorporated herein at least by reference.

BACKGROUND OF THE INVENTION

1. Field of the Invention

The present invention is in the technical field of computer-implemented inventions, and pertains more particularly to enabling secure access to on-board computerized systems in vehicles such as automobiles.

2. Description of Related Art

Sophisticated computers control most vehicles sold at the time of the present patent application. These computers and the data they generate cannot be easily accessed and manipulated by software developers. The only way to access the computers is through an Onboard Diagnostics Port (OBD) present in most modern automobiles and trucks, which couples to the vehicle's Controller Area Network (CAN) bus. However, accessing the computers and the internal networks of a vehicle through this port requires dedicated hardware and software. It also requires specialized knowledge of protocols used to communicate with computerized systems in vehicles. This prevents most software developers from accessing the computers and data available in vehicles and building useful applications for them. What is needed is a secure system that makes automobile computers and data more easily and securely accessible.

BRIEF SUMMARY OF THE INVENTION

In an embodiment of the invention a Link device is provided, comprising a processor connected to an internal Link bus, a non-transitory memory coupled to the Link bus, a digital device ID unique to the Link device, one or both of firmware or software executing from non-transitory media, a first communication port enabled to communicate with a vehicle bus coupling computerized devices in a vehicle, and a second communication port enabled to communicate with one or more digital devices external to the vehicle. The firmware or software enables the Link device to communicate with the vehicle bus, and to accomplish a variety of tasks including pulling data from data stores in the vehicle and operating specific vehicle functions, and wherein the firmware or software manages communication with the one or more external digital devices, accepting only requests for cooperation with the Link device using the unique device ID with a request that is cryptographically secure.

In one embodiment a security key is associated with the Link device, and to be processed the request for cooperation must be signed using the security Key. Also in one embodiment the Link device is hard-wired into circuitry of the vehicle. Also in one embodiment the link device is coupled to an On Board Diagnostics (OBD) connector, and connected to an OBD connector of the vehicle.

In another embodiment the second communication port comprises cellular circuitry for connecting with a cellular wireless network. In yet another embodiment the second communication port comprises near-field pairing circuitry enabled for connecting to a digital device in range that is also enabled for compatible near-field pairing. In still another embodiment the digital device in range is a mobile communication appliance associated with a specific user that is also associated with the vehicle.

In another embodiment the mobile communication device executes an application bearing a specific and unique App ID. Also in another embodiment, once a request for cooperation is approved, the requesting application is enabled to cause the link device to accomplish individual tasks from the variety of enabled tasks. In yet another embodiment access to tasks in the variety of tasks is limited for individual users seeking access to the Link device by an authorized user selecting to allow only individual ones of the tasks in the variety of tasks. In another embodiment selection of tasks is made in a dialogue window presented to the authorized user.

In another aspect of the invention a method is provided, comprising steps of coupling a Link device to a vehicle bus coupling computerized devices in a vehicle, the Link device having a processor connected to an internal Link bus, a non-transitory memory coupled to the Link bus, a device ID unique to the Link device, one or both of firmware or software executing from non-transitory media, and a communication port enabled to communicate with one or more digital devices external to the vehicle, receiving a request to cooperate by the Link device from an external digital device via the communication port, approving the request to cooperate only if it references the device ID and is cryptographically secure, and granting to the external digital device ability to accomplish a variety of tasks including pulling data from data stores in the vehicle and operating specific vehicle functions.

In one embodiment of the method a security key is associated with the Link device, and approval requires that the request for cooperation must be signed using the security Key. Also in one embodiment the Link device is hard-wired into circuitry of the vehicle. Also in one embodiment the link device is coupled to an On Board Diagnostics (OBD) connector, and connected to an OBD connector of the vehicle. In still another embodiment the communication port comprises cellular circuitry for connecting with a cellular wireless network.

In another embodiment of the method the communication port comprises near-field pairing circuitry enabled for connecting to a digital device in range that is also enabled for compatible near-field pairing. In another embodiment the digital device in range is a mobile communication appliance associated with a specific user that is also associated with the vehicle. In still another embodiment the mobile communication device executes an application bearing a specific and unique App ID.

In another embodiment, once a request for cooperation is approved, the requesting application is enabled to cause the link device to accomplish individual tasks from the variety of enabled tasks. In yet another embodiment access to tasks in the variety of tasks is limited for individual users seeking access to the Link device by an authorized user selecting to allow only individual ones of the tasks in the variety of tasks. In still another embodiment selection of tasks is made in a dialogue window presented to the authorized user.

DETAILED DESCRIPTION OF THE INVENTION

Figure 1:
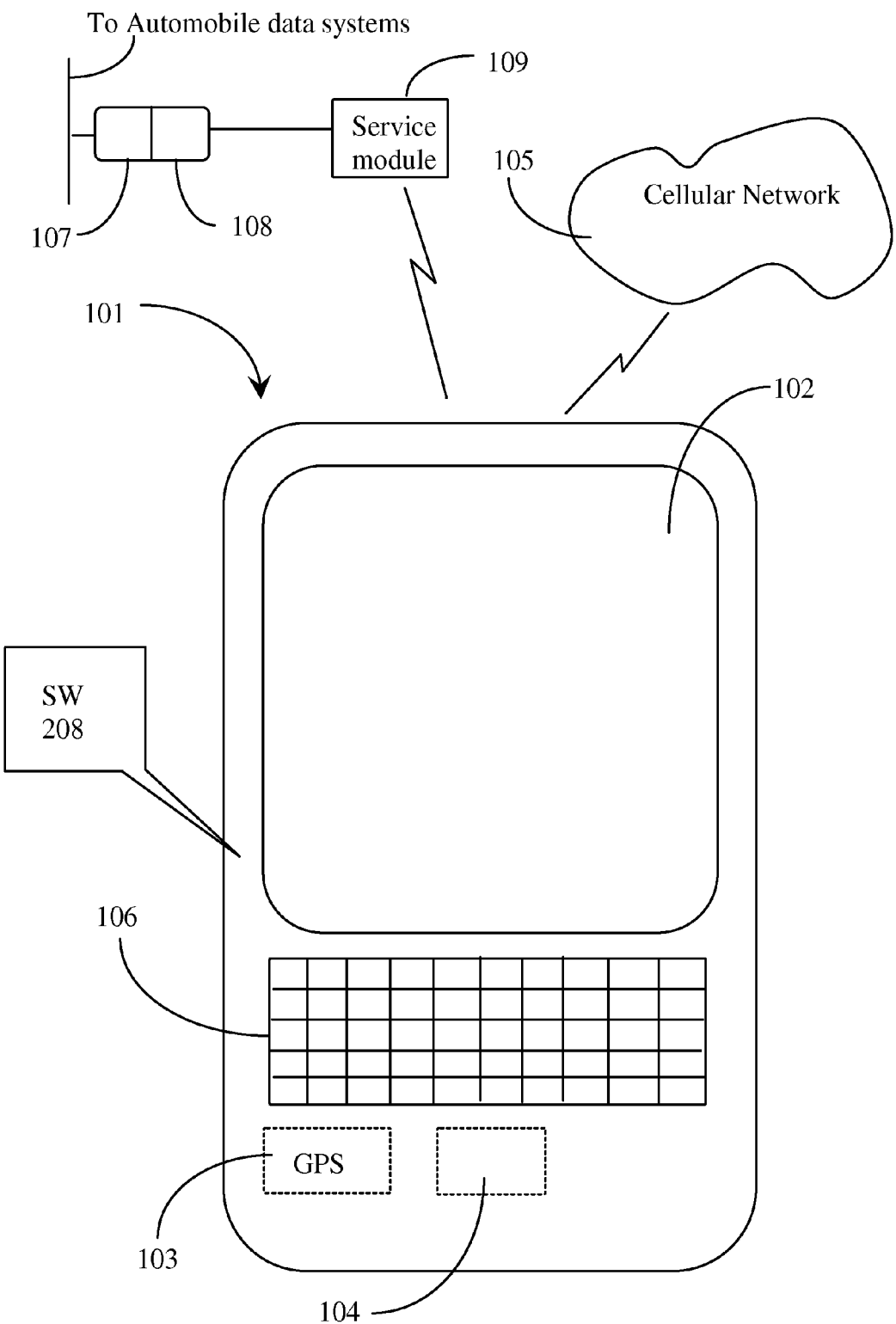
FIG. 1 is a diagram illustrating elements and connection of the elements in an embodiment of the present invention.

FIG. 1 is a diagram illustrating a computerized communication appliance, such as a smart phone 101, in an embodiment of the present invention, in near-field wireless pairing with a service module 109 termed an Automatic Link by the present inventor and the enterprise that employ's him. Henceforth this module will be termer the "Link", and should be regarded as a computerized hardware device executing firmware and software proprietary to the enterprise. Link 109 is connected via an OBD connector 108 with an OBD connector 107 of a vehicle in which the smart phone is carried. Service module 109 in this arrangement has access to data and functions of on-board computers in the vehicle, and has elements and functionality described further below.

Smart phone 101 has a display 102, which may be a touch-screen display, and is coupled wirelessly to a cellular network 105 for placing and receiving calls and accessing the well-known Internet network through a gateway in the cellular network. Thus device 101 is capable by execution of a browser application to access web pages of sites in the Internet, and capable of transmitting data to and receiving data from such sites.

One capability of link 109, as described briefly above, is near-field pairing, such as by Bluetooth™ wireless pairing. Link 109 may therefore by in wireless communication with device 101, also enabled for Bluetooth™ pairing.

Figure 2:
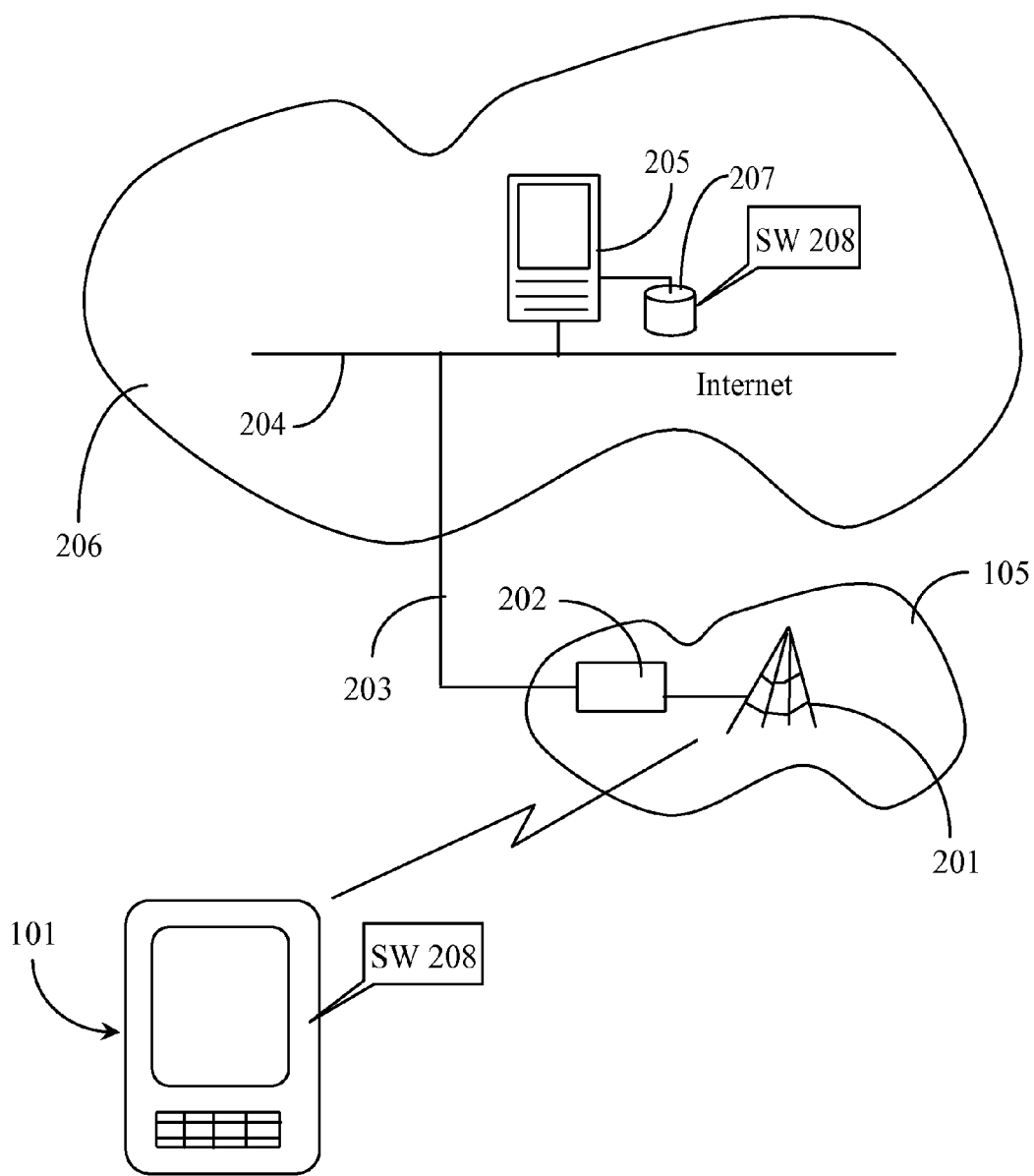
FIG. 2 is an architectural diagram illustrating further elements and connection in an embodiment of the present invention.

FIG. 2 is an architectural diagram illustrating device 101 coupled to cellular network 105, and through a base facility 201, a gateway 202 and path 203 access to Internet backbone 204. Internet backbone 204 represents all connections and interconnections in the Internet network. A server 205, hosted by an enterprise not shown, is connected to the Internet backbone and coupled to a database 207. Device 101 may thus download applications from pages of a web site hosted by server 205, may execute such applications, and may also cause server 205 to execute applications and exchange data with device 101. Device 101 may by virtue of the near-filed communication exchange data and software (SW) functions with Link 109 (FIG. 1).

Computers in modern cars have numerous capabilities. These includes things as simple as indicating how fast the vehicle is moving (velocity) to unlocking the car's doors. Most of these capabilities are exposed through the car's Onboard Diagnostics Port (OBD port). The communication protocol to communicate with the car's computers to get information, like velocity, is fairly standardized into a few known protocols. Other actions, like unlocking the door, may be communicating over some manufacture-specific proprietary protocol.

The Link device in embodiments of the present invention has software and hardware that is capable of understanding all of these protocols and presents an application running on a smart phone or a general purpose computer paired with the Link with a single, simple way of communicating with the car. In embodiments of the present invention this application is an application indicated as SW 208 in FIGS. 1 and 2, and is a proprietary application provided by server 205 hosted by an enterprise that also provides Link 109, and variety of services via server 205 to users of Link 109 and application SW 208. This mechanism is similar to Software Application Programming Interfaces (API) used in other software-based products.

Figure 3:
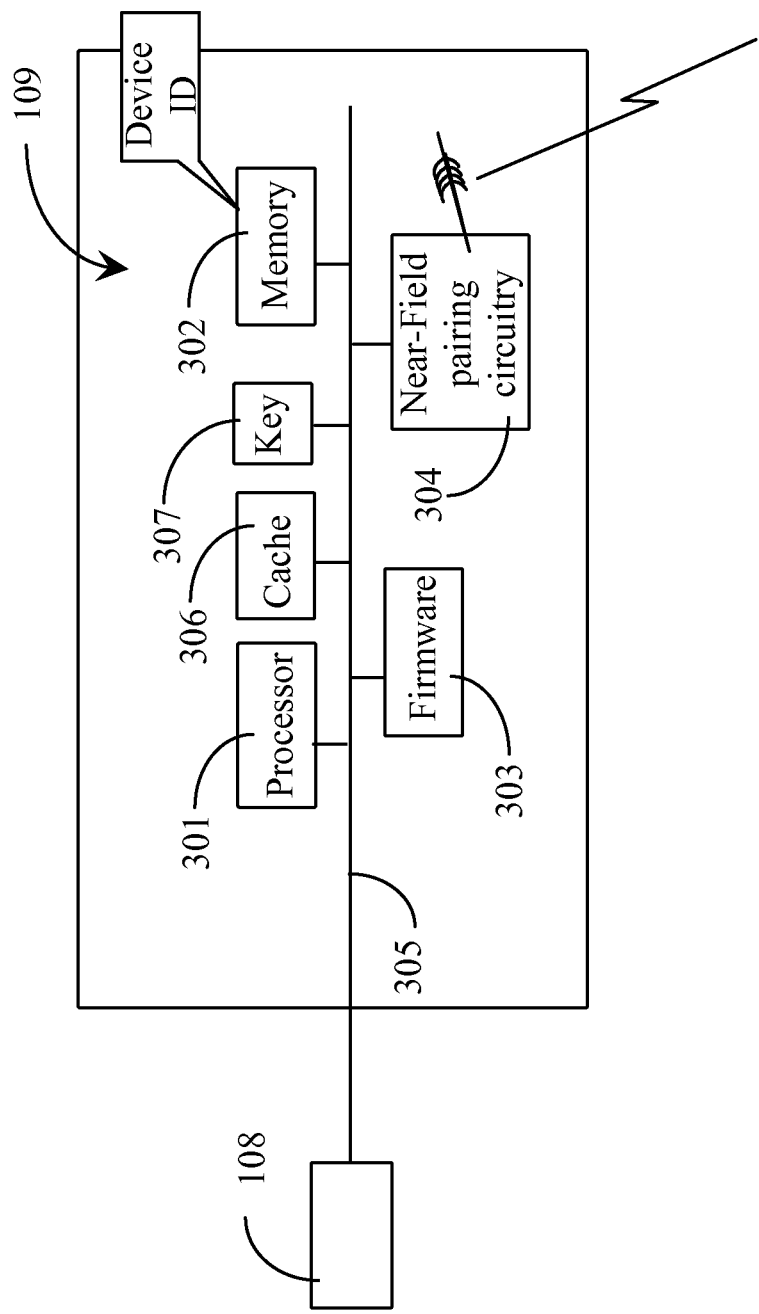
FIG. 3 is a representation of internal components of a hardware link in an embodiment of the present invention.

FIG. 3 is a representation of internal components of Link 109 in an embodiment of the present invention. Link 109 comprises a hardwired path to OBD connector 108, which is compatible with OBD connectors in modern vehicles. Connector 108 connects to an internal bus structure 305 which couples internal digital components. A processor 301 executes software that may be stored in an internal non-transitory physical digital memory 302, and manages all communication between Link 109 and both the OBD system of a vehicle to which connector 108 may be coupled, and between Link 109 and any device paired through pairing circuitry 304. Firmware 303 is controlled in execution by processor 301, and may be updated and amended through pairing circuitry 304 in communication with functions of a paired computerized device, particularly device 101 described above.

Link 109 in various embodiments of the present invention is connected to the OBD Port of a vehicle, as is shown in FIG. 1, and acts like a wireless gateway to the vehicle's OBD system through the vehicle's OBD port. Link 109 presents itself as an Application Programming Interface (API), which is accessible wirelessly. Capabilities of the Link are available for use by any application written to leverage these APIs. One such application is SW 208 described above. The host enterprise controls SW 208 completely and can ensure no malicious activity will happen through the SW, the enterprise does not have complete control over software written or provided by third-party entities. This there is a need for a secure API, which can authenticate different software applications to access specific capabilities of Link device 109.

As a specific example, SW 208 may be provided in a manner to be able to wirelessly unlock the vehicle's doors and also to be able to access from the OBD system the vehicle's velocity in real time, but the enterprise wants to limit third-party applications to only access the real time velocity, and not be able to unlock the vehicle's doors.

Access Control (ACL) in embodiments of the invention is provided to selectively access any capabilities provided by the Automatic Link. The mechanism is similar to Facebook API. Software applications written to leverage the Facebook API are allowed to access only specific personal information the user has allowed the application to access, like only the user's email address and phone number but not relationship status or date of birth. In embodiments of the present invention the same fine-grained ACL is enabled to capabilities and information available in the vehicle's computer.

In one embodiment of the present invention a secure API is achieved in this way: Firstly every Link 109 manufactured and sold to a user has in memory a specific secret Key which is unique to that Link and also a unique Identifier (Device ID). The Key and Device ID are indicated as elements 306 and 307 in FIG. 3. Every Link sold is entered and tracked by the enterprise server 205, and only the server has the unique secret key for each Link in the field.

When a Link is sold, the buyer (user) is registered and associated with a User ID. When an application is developed to use the secure API and provided to the public, the application is also assigned a unique identifier as an App ID.

A software abstraction layer is executed by every Link in embodiments of the invention, and that layer, as a filter in the Link, expects and looks for a sequence of data specifically generated for a given User ID and App ID to specify what capabilities should be exposed to the user when using the particular application with that App ID. The sequence of data is further expected to be Cryptographically Signed using the Secret Key of the specific Link, known only to Server 205 hosted by the enterprise that sells the Links and manages the use of Links and Applications through Server 205. Signing is a common mechanism used to identify two parties to each other communicating over an insecure channel.

When a user accesses an Application with an App ID, the user is presented with a user Interface dialog window that enables the user to select and deny capabilities and information that will be allowed through his or her Link coupled to the OBD port in the user's vehicle.

Figure 4:
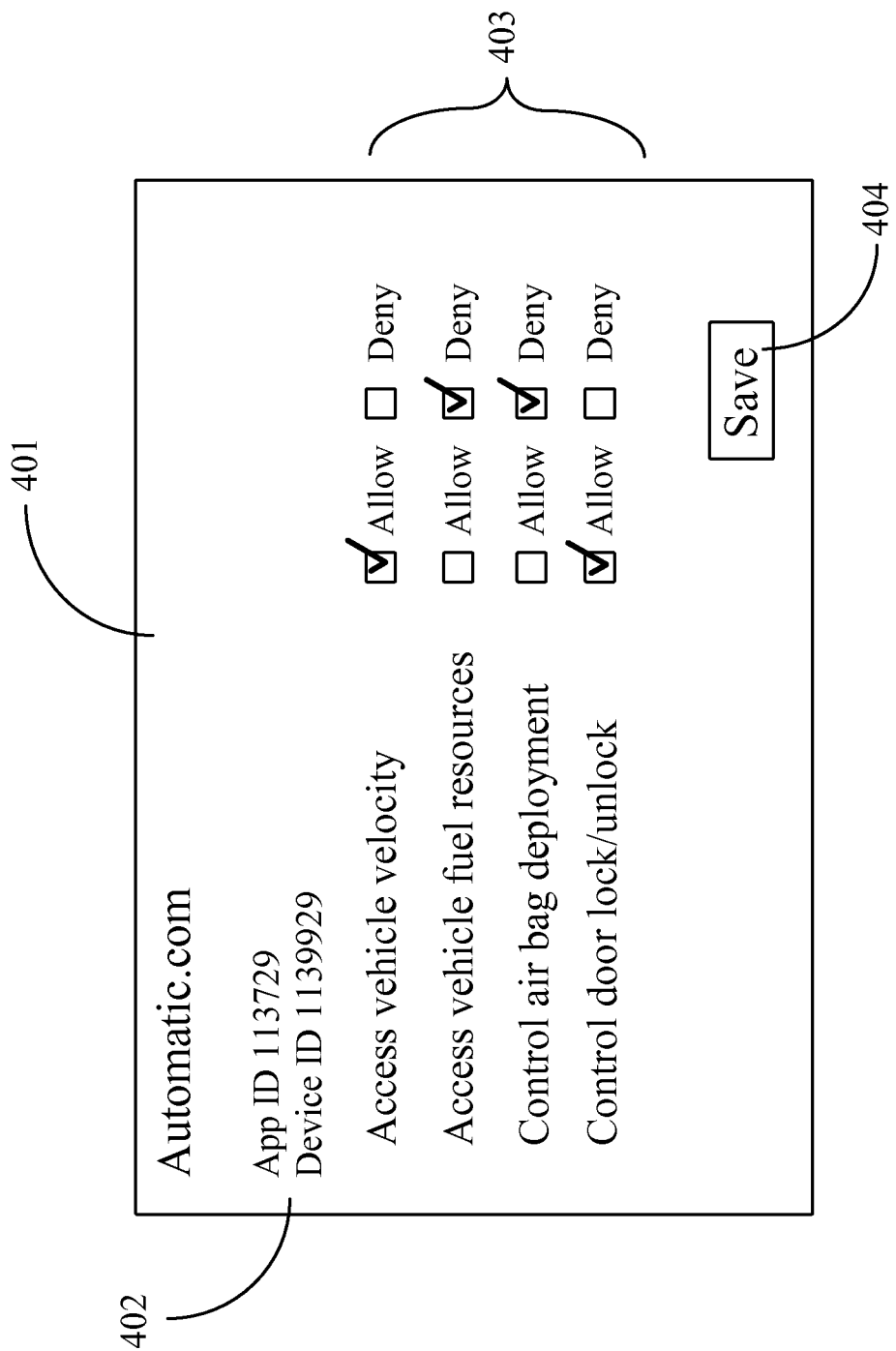
FIG. 4 is an illustration of an exemplary dialog in an embodiment of the present invention.

FIG. 4 is a simplified example of a dialog 401 presented to a user at this point to configure access to capabilities of a specific Link by a specific App. An Enterprise ID is provided in the dialog, and at location 402 ID of the specific Link device and the specific Application being installed on the user's communication device 101. Capabilities of the Link are listed and check boxes 403 are provided for the user to allow or deny each capability. When the user is satisfied with the configuration a Save button 404 saves the configuration in the user's App of at Server 205, or both.

The Save command sends the selection to the host Server, which validates the request and sends back the specific sequence of data as described above, which includes the configuration and the ID of both the App and the Link. The sequence is relayed to the link by the near-field pairing communication, such as Bluetooth™, and the SW abstraction layer in the Link validates the sequence by confirming if it was indeed signed by the Secret Key of the given device.

Once the signature is verified by the filter in the Link, the user and the application are then allowed to access the capabilities that were chosen in the dialogue of FIG. 4. If the signature does not conform to what the Link device expects, any request for accessing the selected capabilities is denied in the Software Abstraction Layer.

The Dialog informing the user about the required permissions is strictly controlled by the enterprise server or the App executing in the user's device 101, or by both in combination. This is important to avoid situations where the user may be shown a limited set of capabilities in the Dialog, but the request sent to the server has additional capabilities the user for which the user did not give explicit permission.

In various embodiments of the present invention a wide variety of applications that may be executed by a user's communication device 101 may be developed and provided for a wide variety of use cases, and may be configured to access a Link 109 having the capabilities described and taught herein, in particular APIs facing a vehicle's internal computer systems, and secure access and use through Device ID and Key. The unique capabilities of the Link as described and taught herein enable SW developers to create apps that are configured to work through the unique Links, without having to have and to program specific protocols and details that would be necessary without the standard provided by the unique Links provided herein.

In some embodiments an application executing on user's device 101 or at server 205 may access a Link 109 by specific ID, and update software or firmware or both of the Link. In these embodiments a unique sequence including the device ID and the Key in the Link, and a special string enabling the update or action, is sent by the wireless connection to the Link, and the link may recognize and authorize the update request, after which the requested changes in software or firmware may be made by the requesting device with following instructions and data, recognized by the Link.

In some other embodiments special requests may be made through wireless sequence, including Link ID and Key, and a string requesting a unique action related to the vehicle's computer system through its CAN bus, such an action perhaps designed to alter data or action of the internal computer system of the vehicle.

It will be apparent to the skilled person that there are amendments and variations that may be made in the examples and embodiments described in this specification that do not alter the overall concept of the invention. There are, for example, many different ways that the components of the Links may be provided and arranged to interact, and many variations in the ways that applications may be programmed that are not explicitly described herein, but do not affect the scope of the invention. The scope of the invention is limited only by the claims that follow.

The invention claimed is:

1. A system, comprising:
a processor connected to an internal Link bus in a Link device;
a non-transitory memory coupled to the Link bus;
a connector interface connected to the Link bus and to an On Board Diagnostic (OBD) connector of a vehicle, the OBD connector of the vehicle accessing a Controller Area Network (CAN) bus of the vehicle;
a digital device ID unique to the Link device;
first software executing on the processor from the non-transitory memory, the first software providing a plurality of functions for the Link device, including at least accessing information regarding vehicle status and operating one or more vehicle functions, including at least unlocking vehicle doors;
a wireless communication port enabled to communicate with one or more digital devices external to the vehicle, said communication port having circuitry capable of near-field pairing;
a computerized server connected to a wide area network (WAN) the computerized server hosted by an enterprise providing link devices and software applications to users; and
a mobile communication device connected to the WAN, storing and executing a software application provided by the network-connected computerized server, the software application uniquely associated with the Link device and enabled to communicate with the first software via the wireless communication port;
wherein the first software enables the Link device to communicate with the OBD, and to manage communication with the mobile communication device via an interactive interface provided on a display screen of the mobile communication device by the second software, and the interactive interface displays the plurality of functions of which the Link device is capable, and enables a user to configure the Link device by enabling or denying individual functions.

2. The Link device of claim 1 wherein a security key is associated with the Link device, and to be processed the request for cooperation must be signed using the security Key.

3. The system of claim 1 wherein the Link device is hard-wired to the OBD connector.

4. The system of claim 1 wherein the second communication port comprises cellular circuitry for connecting with a cellular wireless network.

5. The system of claim 1 wherein the mobile communication appliance is associated with a specific user that is also associated with the vehicle.

6. The system of claim 5 wherein the mobile communication device executes an application bearing a specific and unique App ID, wherein the App ID is associated with the digital device ID and received at the link device in order to allow the communication.

7. The system of claim 1 wherein, once a request for cooperation is approved, the interface enables the user to accomplish individual tasks from a variety of enabled tasks including at least pulling data from data stores in the vehicle and operating door locks of the vehicle.

8. The system of claim 7 wherein access to tasks in the variety of tasks is limited for individual users seeking access to the Link device by an authorized user selecting to allow only individual ones of the tasks in the variety of tasks.

9. The Link device system of claim 8 wherein selection of tasks is made in a dialogue window on the mobile communication device presented to the authorized user via the second software.

10. A method comprising steps:
coupling a Link device to an On Board Diagnostics (OBD) connector and OBD system of a vehicle coupled to an internal Link bus and a controller area network (CAN) bus of the vehicle, accessible via the OBD connector, thereby coupling computerized devices in a vehicle, the Link device having a processor connected to the internal Link bus, a non-transitory memory coupled to the Link bus, a device ID unique to the Link device, first software executing from non-transitory media, and a communication port enabled to communicate with one or more mobile communication appliances external to the vehicle via near-field pairing;
receiving a request to cooperate by the Link device from second software stored on and executing from the mobile communication appliance, via the communication port;
approving the request to cooperate only if it references the device ID and is cryptographically secure; and
displaying an interactive interface on a display screen of the mobile communication appliance, the interface listing a plurality of functions of which the Link device is capable, enabling a user an ability to configure operation of the Link device by enabling or denying individual functions.

11. The method of claim 10 wherein a security key is associated with the Link device, and approval requires that the request for cooperation must be signed using the security Key.

12. The method of claim 10 wherein the Link device is hard-wired into OBD circuitry of the vehicle.

13. The method of claim 10 wherein the communication port comprises cellular circuitry for connecting with a cellular wireless network.

14. The method of claim 10 wherein the mobile communication appliance is associated with a specific user that is also associated with the vehicle.

15. The method of claim 14 wherein the mobile communication device executes an application bearing a specific and unique App ID, wherein the App ID is associated with the device ID and received at the link device in order to allow the communication.

16. The method of claim 10 wherein, once a request for cooperation is approved, the requesting application is enabled to cause the link device to accomplish individual tasks from the variety of enabled tasks, including at least pulling data from data stores in the vehicle and operating door locks of the vehicle.

17. The Link device of claim 16 wherein access to tasks in the variety of tasks is limited for individual users seeking access to the Link device by an authorized user selecting to allow only individual ones of the tasks in the variety of tasks.

18. The method of claim 17 wherein selection of tasks is made in a dialogue window presented to the authorized user via the second software.

* * * * *